Aug. 5, 1958      A. C. RUGE      2,846,645
REMOTE POTENTIOMETER NETWORK MEASURING SYSTEM
Filed July 2, 1953      2 Sheets-Sheet 1
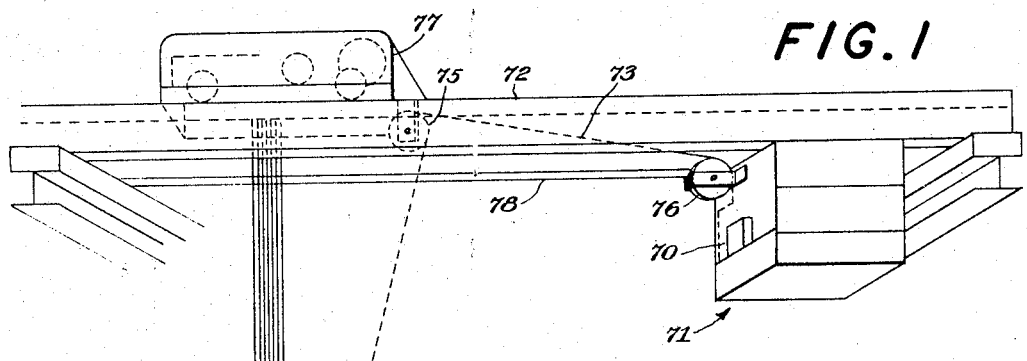
FIG. 1
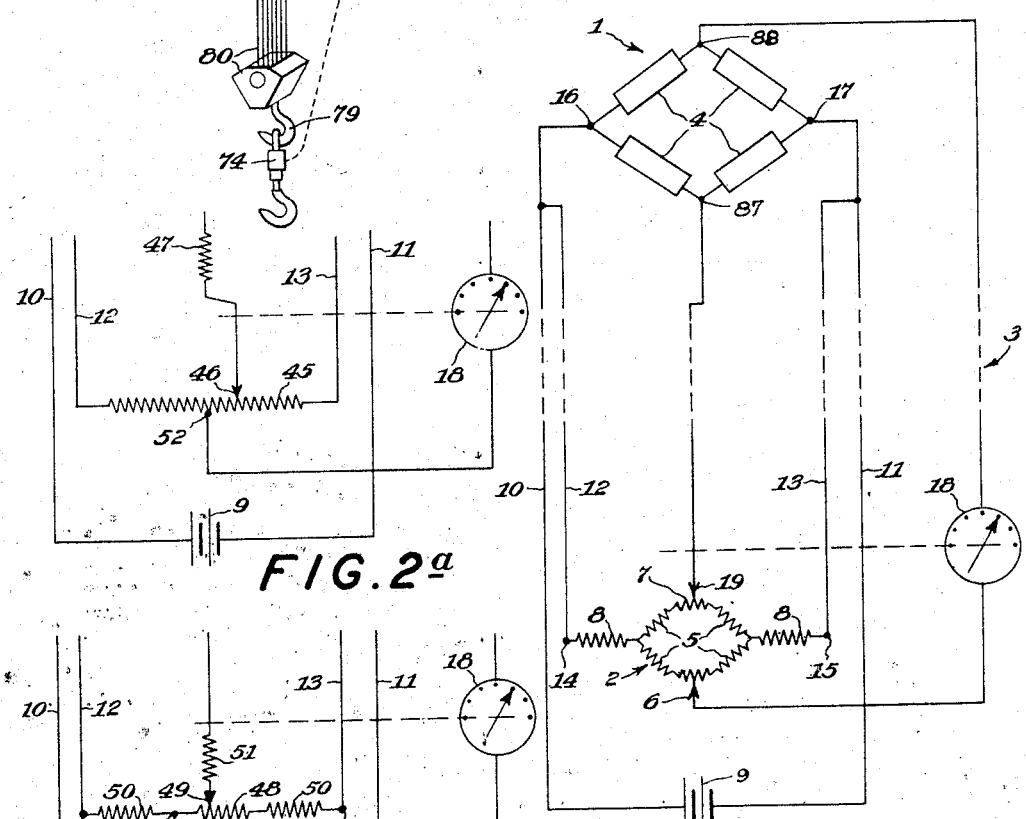
FIG. 2
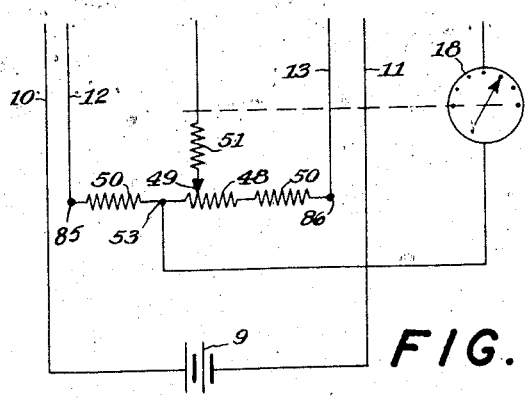
FIG. 2ᵃ
FIG. 2ᵇ
INVENTOR.
ARTHUR C. RUGE
BY
ATTORNEY Aug. 5, 1958  A. C. RUGE  2,846,645
REMOTE POTENTIOMETER NETWORK MEASURING SYSTEM
Filed July 2, 1953  2 Sheets-Sheet 2
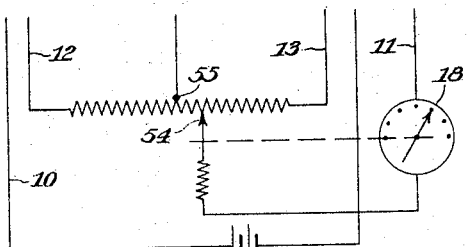
FIG. 2
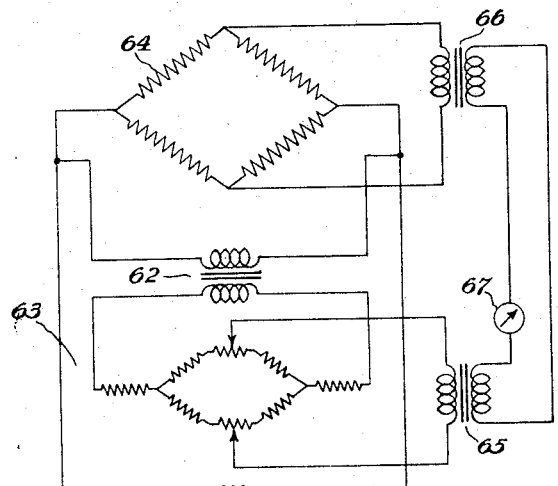
FIG. 5
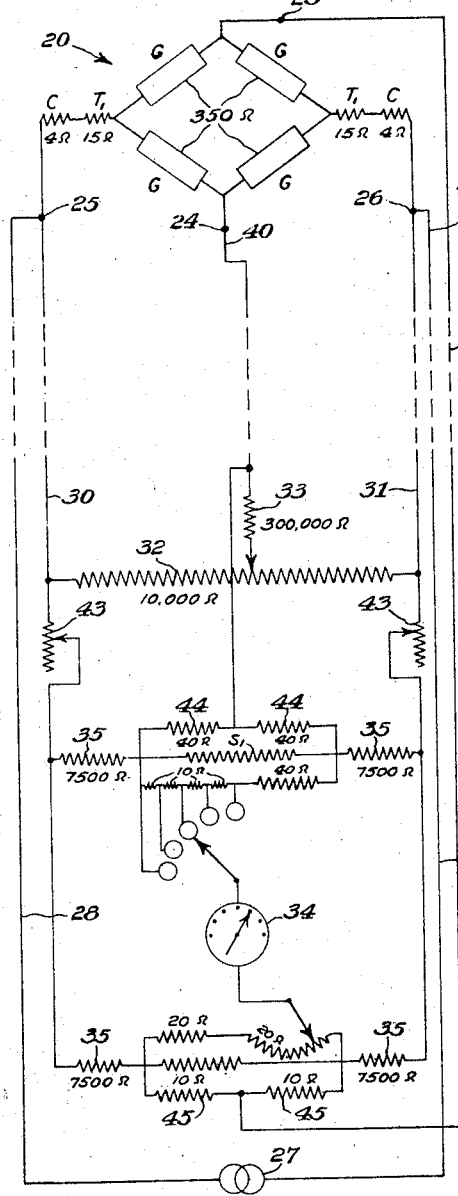
FIG. 3
FIG. 4
INVENTOR.
ARTHUR C. RUGE
BY
ATTORNEY United States Patent Office 2,846,645
Patented Aug. 5, 1958

2,846,645

REMOTE POTENTIOMETER NETWORK MEASURING SYSTEM

Arthur C. Ruge, Cambridge, Mass., assignor to Baldwin-Lima-Hamilton Corporation, a corporation of Pennsylvania Application July 2, 1953, Serial No. 365,604

13 Claims. (Cl. 324—57)

This invention relates generally to remote bridge measurements and is particularly applicable to apparatus such as crane scale load weighing equipment.

In my copending application Serial No. 365,686, filed July 2, 1953, now Patent No. 2,815,480, I disclose a system which I have found especially useful with bridge circuits such as are used in resistance strain gage bridges employed in such devices as load cells and pressure cells. The present invention concerns itself with an improvement which makes it practical to achieve such parallel bridge operation in the case of networks which are remotely located relative to each other, the measurement being substantially unaffected by the physical distance between the networks such as is the case, for example, in crane scales. The present invention is also applicable to measurements involving bridges which are not connected directly in parallel, as will appear below.

It is an object of this invention to provide means whereby the unbalance of a remotely located potentiometer network can be accurately and precisely measured at a point remote from the network, the accuracy and precision of the measurement so obtained being substantially independent of the length and electrical resistance of the wires or cables which connect the remote bridge to the measuring instrument.

It is a further object of this invention to substantially eliminate any effects of the temperature of the interconnecting cable upon the accuracy of the measurement of the unbalance of the remote bridge.

A still further object is to make it possible to vary the length of the interconnecting cable between the remote network and the measuring instrument through wide limits in a given installation substantially without affecting the calibration of the system and substantially without affecting its accuracy and precision of measurement.

Other objects and advantages will be more apparent to those skilled in the art from the following description of the accompanying drawings in which:

Fig. 1 is a diagrammatic perspective of one form of shop crane with which my improved load weighing measuring system is particularly applicable;

Fig. 2 is a wiring diagram of a simplified form of my measuring circuit;

Fig. 2a, a modification of Fig. 2, employs a potentiometer in place of the measuring bridge;

Fig. 2b is a modification of Fig. 2a;

Fig. 2c is a modification applicable to Figs. 2a and 2b;

Figs. 3 and 4 are modifications employing all the features of Figs. 2, 2a, 2b, and 2c; and Fig. 5 is a modification of the measuring circuit arranged to provide electrically conducting paths which are not physically continuous when an A. C. power source is used.

Reference to Fig. 6 of my said co-pending application will show that the electrical resistance of the wires running between the several bridges is bound to have some effect upon the measurement since any currents flowing through these wires will result in voltage drops along them, which effects were neglected in said co-pending application because in many practical applications these effects are small or entirely negligible, and even where the lead wire resistances are not negligible, they can in many practical applications be considered to be fixed in magnitude and, once taken into account in adjusting the calibration of the measuring system, they do not enter into the operation of said co-pending application. If, however, we consider the case where the distance between a bridge circuit such as a load cell bridge and the measuring circuit is great, or where this distance may be changed for some reason, then we can see that where very accurate measurements are required it is not always possible to neglect the effects that may be due to the resistances of the interconnecting lead wires.

A practical case in point would be a crane scale, the load-sensing element of which comprises a typical bonded-wire strain gage load cell so arranged that the load suspended from the hook of the scale is transmitted to the cell. In Fig. 1 is shown a practical crane scale arrangement in which the load measuring instrument 70 is placed in the cab 71 of the crane 72 and the cable 73 leading to the load cell 74 is payed out from cable reels 75 and 76 as the crane carriage 77 moves back and forth across the structural crane bridge 78 and as the crane hook 79 moves up and down by usual sheaves and wire rope 80. In the case of a large crane, electrical cable lengths of as much as 200 or more feet are required for transmitting the load responsive electrical signal from the load cell to the instrument. If we consider the electrical resistance that a 200 foot length of cable introduces into the power circuit of the load cell bridge and assume we are using No. 20 gage wire, we see that a total of 400 feet of wire is involved which amounts to a resistance of approximately 4 ohms. Since the load cell circuit might be of the order of 200 ohms terminal resistance, it is clear that the cable resistance has a very definite effect upon the calibration of the measuring system.

Now in a fixed installation such as shown in the Fig. 1, it might be thought that once the calibration is properly adjusted the lead wire resistance can be ignored from that point on. This would be true were it not for the fact that variation in the cable temperature will cause the cable resistances to change and thus, to a certain degree, upset the accuracy of the calibration. This is particularly true where the installation is out in the open or where the cable must undergo extreme changes of temperature as would be the case of a crane in a foundry or steel mill. In the example just given, the resistance in the power leads of the load cell bridge can easily change as much as an ohm under various operating conditions and such a change would be sufficient to reduce the accuracy of measurement below tolerable levels where very high precision weighing is required.

Another case of practical importance is encountered where the cable length is changed for any reason. In the prior art, whether or not the circuits of the aforementioned pending application were used, it was necessary to adjust the calibration of the measuring system whenever a substantial change was made in the cable resistance connecting the load cell bridge and the measuring instrument. This always presented a serious difficulty to the manufacturer of such equipment since each application had to be handled individually and the calibration had to be adjusted after the final cable length and wire size were determined. This prevented the manufacturer from producing completely finished equipment which could be delivered from stock regardless of what the cable length of a given installation might turn out to be. In addition, because of the effects of temperature upon the cable as described above, it was necessary to analyze each installation and in many cases make changes in design and special adjustments to minimize such temperature effects. It also occasionally happens that the purchaser of such equipment will add or remove cable length without consulting the manufacturer of the equipment and thus throw the system out of calibration, which can lead to serious difficulties where precision weighing is involved.

My present invention, which I describe as a "six-wire system for remote potentiometer network measurement," eliminates all of these problems for all practical purposes and thus greatly improves the flexibility of application, saleability of the equipment, and overall accuracy, while at the same time effecting marked economy in the engineering and manufacturing of the equipment.

Fig. 2 illustrates one of the simplest embodiments of the present invention. A remote bridge generally indicated at 1 is connected to a measuring network generally indicated at 2 through continuous electrical conducting paths or wires of arbitrary lengths, being generally indicated at 3, the dotted portions representing an arbitrary or even changeable length. Bridge 1, for purposes of illustration, might be a load cell bridge circuit comprising resistance strain gages 4. The load cell could, for example, be the force-measuring dynamometer shown in my Patent No. 2,561,318 and strain gages 4 could be the gages 16, 17, 18, 19 shown in Fig. 3 of that patent, the bridge connections being so arranged that the bridge is responsive to axially applied load acting on the cell. In accordance with the teachings of my said copending parallel bridge operation application, I show a measuring bridge comprising four impedance arms 5, zero adjustment potentiometer 6, and measuring slide wire 7, the measuring bridge being connected in parallel with load cell bridge 1 through isolating resistances 8. A source of D. C. or A. C. power 9, normally, but not necessarily, located at or near the measuring circuit 2 is directly connected through leads 10, 11 to the power corners 16, 17 of bridge 1 and is connected to the measuring bridge only through the parallel bridge connecting wires 12, 13. That is to say, regardless of how much resistance there may be in wires 10, 11, the voltage applied to terminals 14, 15 of the measuring bridge circuit will differ from the voltage applied to load cell bridge terminals 16, 17 only as a result of any voltage drops that may be present in wires 12 and 13. I call this network between terminals 14, 15 a "potentiometer network" since this network performs the function of a potentiometer in measuring the condition of the remote bridge 1. Similarly closed bridge networks such as 1 in Fig. 2 terminating in 16, 17 and 20 in Fig. 3 terminating in 25, 26, I refer to as "potentiometer networks," as I have fully explained in my copending application.

The voltage output corners of bridge 1 and of the balancing bridge are connected so as to add the outputs and the resultant is connected into a servo type null-balancing indicator 18 which drives slider 19 until a state of balance between the output voltage of the load cell bridge and the measuring bridge is achieved, and the load is indicated on indicator 18 by a pointer which indicates the position of slider 19 on a graduated scale calibrated in terms of load. The dashed line joining slider 19 and indicator 18 represents the conventional servo relationship. Obviously, as will be seen from the following disclosure, the particular type of indicating, recording, or printing device used at 18 is unimportant so long as its input impedance is high relative to the impedance as seen from its input terminals looking back into the circuit from which it operates. I prefer a null-balancing type of instrument because it has essentially an infinite input impedance when at the null-balance point.

In speaking of the "outputs" of such networks as the closed bridge network 20 of Fig. 3 and the potentiometer having input terminals 85, 86 in Fig. 2b, it is convenient to think in terms of the open circuit output voltage per unit of applied load, pressure, etc., for a unit of voltage applied to the input terminals of the circuit, the result being a non-dimensional constant of the entire network. By "open circuit output" of a network is meant the voltage that would appear across the output terminals of the network if nothing were connected across them. From a knowledge of the open circuit in any given network such as these, it is well known that one can readily calculate what the output will be when any given impedance is connected across its output terminals.

It will be seen that I here employ six wires to form the connections between the remote bridge and the measuring circuit. It is this arrangement which forms the basis of the present invention. It may readily be seen that, since the entire bridge currents drawn by bridge 1 and the measuring network 2 flow through wires 10 and 11, any change in the resistance of these paths will produce an appreciable change in the voltage appearing across terminals 16, 17 when long wires are involved or even where short wires of small cross-sectional area are involved. On the other hand, since my measuring bridge is connected close to terminals 16, 17 and since I make the resistance between input terminals 14, 15 large relative to the resistance of conductors 12, 13, it may be seen that even if I introduce a substantial amount of resistance in wires 12, 13, the effect upon the system can be made arbitrarily small. This is the essence of the invention—within very wide limits, I can make the input impedance of the network between terminals 14, 15 as large as I please and thus reduce the effect of any resistance in wires 12, 13 or any changes in their resistances to totally negligible proportions.

In the embodiment illustrated in Fig. 2, I employ in measuring network 2 a potentiometer network having input terminals 14, 15 and output terminals 6, 19, here shown as independent adjustable potentiometer contacts on a closed bridge type of double potentiometer having arms 5. Preferably, I connect in series with the power input terminals of the potentiometer a set of isolating resistors 8 which serve to isolate the potentiometer as disclosed in my copending application filed herewith, and which also serve to make the input resistance of the network (as measured from its input terminals 14, 15) large relative to the resistance of conductors 12, 13, thereby making the voltage applied across input terminals 14, 15 substantially equal to the voltage applied across input terminals 16, 17 of the remote network 1 and also substantially independent of the electrical impedance of the conductors 11, 12.

The network 1 is also a potentiometer network, here shown for illustrative purposes as a closed bridge having arms 4, power input terminals 16, 17, and independent fixed output contacts 87, 88. One or more of arms 4 may be responsive to strain, temperature, or other condition. The criteria for all of my potentiometer networks are that they have two input and two output terminals, and that the output voltage is proportional to the product of the voltage applied across the input terminals and a function of a condition to be measured.

I connect the outputs of the two potentiometer networks of Fig. 2 in series so that a single combined output is presented to an output responsive device 18. It may be seen that this single combined output is proportional to the algebraic sum of the open circuit outputs of networks 1 and 2. Furthermore, the combined output is made substantially independent of the impedance of connecting means 12, 13, whereby the relative contributions of the two networks to the combined output is substantially independent of the impedance of means 12, 13. And, since connecting means 10, 11 does not affect the relative contributions of the two networks, it follows that these relative contributions are substantially independent of the electrical impedance of both of the connecting means 10, 11 and 12, 13. This very important result of my present invention makes it possible to satisfy the objects set forth above.

As a practical example to show the principles of the matter, if the bridge 1, Fig. 2, is made up of 250 ohm strain gages I might make isolating resistances 8 each equal to 5000 ohms. If, now, the total resistance of wires 12 and 13, is as great as 4 ohms, their effect upon the voltage across terminals 14, 15 as compared with the voltage across terminals 16, 17 is less than four parts in ten thousand, or 4/100 percent. Now, even if this large cable resistance is changed by as much as 50 percent, which is excessive, it would only affect the calibration of the measuring bridge by 1/50 of 1 percent which is totally negligible even in commercial weighing of the highest precision.

Although I have chosen for simplicity of explanation to show in Fig. 2 a very simple embodiment of the present invention, reference to the aforementioned copending application on parallel bridge operation will show that the principles of the present invention will apply to the more complex measuring problems frequently met with in practice. These problems, as was explained in that application, are brought about by such factors as the necessity for modulus compensation, requirement for additional bridge networks and potentiometer networks over and above the two shown in Fig. 2, etc. In my copending application filed herewith I explain in considerable detail the significance of calibration and modulus compensating adjustments as I employ them in the manufacture of such devices as load cells and pressure cells of the bonded wire strain gage type. For that reason, I shall omit such detailed explanations here since they are not per se a part of the present invention.

A study of the disclosure in my copending application filed herewith on parallel bridge networks will show that bridge 1 of Fig. 2 could be made up of two or more bridge networks tied in parallel corner for corner in accordance with the teachings of Figs. 3 and 4 of my copending application. Also it may be seen that in Fig. 2 hereof bridge 1 could be a measuring bridge or, broadly, a potentiometer network as I have defined it, and the measuring circuit 2 could comprise any number of potentiometer networks, as may be seen by reference to Fig. 8 of my copending application. These and similar embodiments of my present invention as it would apply to my copending application and to circuits involving such details as multiple range, adjustable span control, etc., are obvious once the basic principles are understood.

The broad principle underlying Fig. 2 of the present invention is the use of at least two potentiometer networks, a single source of power for energizing all of the networks, the first of said networks being connected to said single source of power through electrically conducting paths, and at least one other potentiometer network being connected to said single source of power through electrically conducting paths which include in series at least a part of the conducting paths which connect said single source of power to said first network, the input impedance of said other network being large relative to the electrical impedance of the paths connecting it to said source of power excluding said part of the first network conducting paths, the output terminals of said first and said other networks being connected in series through electrically conducting paths to provide a single combined output which is responsive to the algebraic sum of the open circuit outputs which the individual networks would have if their output terminals were not connected together by said conducting paths, and means responsive to said single combined output, the relative contributions of the two networks to the single combined output thereby being made substantially independent of the electrical impedances of the conducting paths connecting them to said single source of power.

As stated above, in the preferred embodiment of the present invention the responsive means (18, Fig. 2) would present a high impedance to the combined output circuit to which it is connected; that is, the input impedance of the responsive means would be large relative to the impedance looking back into the circuit from the input terminals of the responsive device. In the case of a null-balancing servo as indicated in Fig. 2, the input terminal impedance of 18 may be very low in the unbalanced condition but can be made to approach infinity in the balance condition. This has the added beneficial effect of substantially eliminating any effects due to resistance in the path connecting the outputs of the bridges. Even if a simple indicating device is used in place of the null-balancing system shown in Fig. 2, the six-wire system disclosed in the present application is still highly beneficial since it substantially eliminates all errors due to resistance in the power-supplying path.

Further consideration of measuring circuit 2 of Fig. 2 will show that the measuring bridge is in reality a double potentiometer—in fact, a bridge of this sort is often referred to as a double potentiometer in the instrument trade. Now, where it is not necessary to vary the potential of the output corners of a closed bridge as provided for at 6, 7 in Fig. 2 the measuring circuit of Fig. 2 can be greatly simplified as shown in Figs. 2a, 2b, and 2c by the use of a single potentiometer arrangement. These figures show alternate measuring circuits to replace circuit 2 of Fig. 2.

In Fig. 2a, a potentiometer network 45 having a slider contact 46 replaces the measuring bridge and isolating resistors 8 which comprise the potentiometer network of Fig. 2. The slider 46 may, if required, have a resistor 47 connected in series with it to adjust the range of action of the Fig. 2a measuring circuit.

Fig. 2b is a variation of Fig. 2a in which a potentiometer network, having terminals 85, 86, includes potentiometer 48 and a slider 49. Potentiometer 48 is connected to the power source 9 of Fig. 2 through isolating resistors 50 which, of course, are part of the network. This potentiometer network replaces the potentiometer network having terminals 14, 15 in Fig. 2. With this arrangement, slider 49 may or may not require a resistor 51 connected in series with it, depending upon the relative magnitudes of isolating resistors 50 and potentiometer 48 and depending upon the range of action required of the measuring circuit. Functionally, Figs. 2a and 2b are substantially the same, the main difference being that for equal range of action of the measuring circuit, resistor 47 in Fig. 2a will have to be in most cases much greater than resistor 51 of Fig. 2b which may be undesirable from the standpoint of preserving maximum sensitivity for detecting means 18.

It will be noted that in both Figs. 2a and 2b the potentiometer sliders are connected directly to an output corner of bridge 1 of Fig. 2 through resistors 47 and 51. In some cases this may be undesirable since the output of remote bridge 1 of Fig. 2 will be somewhat influenced by the position of the slider 46, 49 of Figs. 2a and 2b. This is because the two sections of the potentiometer 45, or 48, 50 exert shunting effects upon the two lower arms of bridge 1 of Fig. 2 and these shunting effects vary, of course, with the position of the sliders.

Fig. 2c shows a method of avoiding this difficulty which is applicable to both the arrangements shown in Figs. 2a and 2b. The essential difference here is that the positions of the slider 54 and the tap point 55 have been interchanged relative to the slider and tap point positions 46, 52, and 49, 53 of Figs. 2a and 2b. In the arrangement of Fig. 2c the shunting effect upon the two lower arms of bridge 1 of Fig. 2 is made constant regardless of the position of slider 54 in Fig. 2c.

While I have shown one of the potentiometer contacts in Figs. 2a, b, c as fixed or "tap" points, it is to be understood that both contacts may be adjustable so as to provide a double adjustment as in the case of the measuring network 2 of Fig. 2. Thus one contact may be used as a zero or tare adjustment while the other may be used to perform the measuring function.

The broad principle underlying Figs. 2a, b, and c of the present invention is the same as that underlying Fig. 2. The closed bridge or "double potentiometer" circuit merely is replaced by a single potentiometer circuit. From the foregoing it is seen that in all of the specific embodiments shown in the various parts of Fig. 2 there is provided a measuring circuit for measuring the unbalance of a closed bridge network, specifically shown herein as a Wheatstone bridge, comprising at least one closed bridge network and one potentiometer network, a single source of power for energizing both of said networks, said closed bridge network being connected to said single source of power through electrically conducting paths, and said potentiometer network being connected to said single source of power through electrically conducting paths which include in series at least a substantial part of the conducting paths which connect said single source of power to said closed bridge network, said potentiometer network having an electrical input impedance which is large relative to the electrical impedance of the path connecting it to the single source of power, exclusive of the part of the path which also serves to connect the single source of power to the bridge network, said potentiometer network having at least two independent electrical contacts, at least one of which is adjustable, said contacts being connected in series with the output terminals of said potentiometer network, the output terminals of said bridge and said potentiometer network being connected in series through electrically conducting paths to provide a single combined output which is responsive to the algebraic sum of the open circuit outputs that would exist if their output terminals were not connected together by said conducting paths, and means responsive to said single combined output, the relative contributions of said bridge and said potentiometer to the single combined output thereby being made substantially independent of the electrical impedances of the conducting paths connecting them to said single source of power.

Where reference is made herein to a "closed bridge network" such as 20, Fig. 3, it is to be considered as including a closed bridge G, G, G, G, and having input terminals 25, 26 and output terminals 23, 24.

Figs. 3 and 4 show practical embodiments of the present invention in a circuit which I have used successfully for a precision weighing application involving a crane scale load cell pickup remotely located from the measuring circuit.

In Figs. 3 and 4 I show embodiments involving all of the concepts covered by Figs. 2, 2a, 2b, and 2c. These illustrations are given in order to show how the six-wire system is applied in a specified case involving circuit details not shown in the generalized case in Fig. 2.

Actual typical resistance values are given so that the remarkable effectiveness of my six-wire system may more readily be appreciated. The load cell network is indicated generally as 20, while the measuring circuit is indicated generally as 21. An arbitrary or even variable length of six wire cabling is indicated as 22 with the dotted portion to represent the arbitrary or variable lengths involved.

Load cell circuit 20 terminating in terminals 25, 26 comprises a Wheatstone bridge made up of four resistance strain gages G, the unbalance of this bridge being a function of the load applied to the load cell. Side resistors $T_1$ and C perform the following functions in accordance with the explanations given in my copending application filed herewith on parallel bridge circuit operations: Resistors $T_1$ are temperature-sensitive resistors used for modulus compensation, while resistors C are employed to adjust the output of the bridge to a predetermined value. The output of a typical load cell would normally be adjusted so that the open circuit voltage developed across terminals 23, 24 at full load on the cell would be, say, 2.00 millivolts per volt applied across the input terminals 25, 26. Although, as also explained in my copending application, it is not necessary to do so, in this application I prefer to use a symmetrical disposition of resistors $T_1$ and C so as to simplify explaining the circuit and to improve the stability of the measuring circuit under variable temperature conditions as might be met with an outdoor weighing operation. The ohmic resistance of all important elements in the circuit of Figs. 3 and 4 are given so as to show how the principles of this invention may be applied to a given specified measuring problem. It is to be clearly understood that this illustration is by no means limiting either as to magnitudes or circuit details.

The measuring circuit 21 in this case is made up of three principal elements: (1) zero set, (2) add steps, (3) interpolating scale. It is to be noted that power supply 27 (which may be A. C. or D. C. or even a combination thereof) is connected to load cell circuit 20 through conducting paths 28, 29 and that the three components of the measuring circuit are connected to the same power supply 27 through conducting paths 30, 28 and 31, 29 which include in series a substantial part of paths 28, 29. The zero set comprises a 10,000 ohm potentiometer 32 the slider of which is connected to one load cell bridge output terminal 24 through a 300,000 ohm resistor 33. While there is a great latitude in the choice of the resistance values involved, one requirement is that the resistance of potentiometer network 32 must be large relative to that of conductors 30 and 31, while another requirement is that resistor 33 must be sufficiently large that the necessary delicacy of zero adjustment is provided to make precision weighing practical and convenient. In Fig. 3 specific values of resistance are given as one specific illustration of the relative values. In practice, the potentiometer 32 is normally a multi-turn potentiometer and the range of the zero set is a few percent of full scale.

It is to be noted that the zero set could just as well be made in the form of a bridge with isolating side resistors or a potentiometer network such as shown in Figs. 2a, b, c, but there would be no particular advantage in such arrangement in this instance.

The weight measurement is performed by operating two closed bridge networks one for affecting the overall balance indicator 34 in step-wise fashion and designated in Fig. 3 as "add steps." The other bridge network is designated as "interpolating scale" and serves to interpolate values of weight between the add steps. It is seen that the two closed bridge networks include 7500 ohm isolating resistors 35, the isolating resistors being in series with the power source 27 and the power terminals of the bridges. It is to be noted that the output terminals of the several bridge networks in Fig. 3 are connected in series to provide a single combined output which acts on null indicator 34.

The add step and interpolating scale measuring bridges can be operated manually or made entirely automatic by servo means (not shown), or by a combination of manual and servo means. In the combination method of operation, the servo normally drives the interpolating scale while the add steps are operated manually. In a 10,000 pound scale for example, the add steps might be 2,000 pounds each and the interpolating scale might read from 0 to 2,000 with two pound graduations. The add steps are operated until a condition of over balance exists (the interpolating scale being at its maximum position) and then the interpolating scale is adjusted to true balance and the weight is obtained by adding the two readings. In still other measuring means, the add steps and interpolating scale are entirely automatically operated and may, in turn, automatically control a digital indicating or printing device which shows the total weight on the crane scale.

I have illustrated in Fig. 3 how a multiplicity of potentiometer networks may be employed to advantage in the measuring system of my present invention. This illustration also serves to show that it is immaterial whether or not the potentiometer networks involve a closed bridge. Comparison with Fig. 2 brings out the fact that the one underlying requirement of the present invention is that there be at least two potentiometer networks as I define the expression.

Similarly, reference to my said copending application filed herewith entitled Parallel Operation of Multiple Potentiometer Networks will clearly bring out the fact that the closed bridge network 20 of Fig. 3 or the closed bridge network 1 of Fig. 2 can be replaced by a multiplicity of bridge networks connected together in accordance with the teachings of that invention. Furthermore, as has been hereinabove explained, a closed bridge network is functionally definable as a potentiometer network and, therefore, any or all such bridge networks may be replaced by potentiometer networks such as any of the types illustrated and/or described herein. Therefore, reference to said copending application will make it immediately clear that a basic requirement of the present invention is that there be at least one potentiometer network located as at 20 in Fig. 3 and at least one potentiometer network located as at "add steps" in Figs. 3 and 4.

In a precision weighing device it is of course necessary that the add steps and interpolating scale be precisely adjusted. One convenient way of doing this is by means of shunts $S_1$ and $S_2$ which normally are large in resistance relative to the respective bridge resistances and which are used to trim the steps and the interpolating scale as precisely as desired to the correct values.

Examination of the magnitudes of the resistance involved in the three components of the measuring system will make it at once apparent that a considerable amount of resistance can be introduced into the connecting paths 30 and 31 without affecting the accuracy of measurement to an appreciable degree. Also, the resistance of paths 30 and 31 can be changed at will or they can change through wide limits as a result of temperature variations without influencing the accuracy of the measurement appreciably. It is further to be noted that an arbitrary amount of resistance can exist in paths 28, 29 without having any effect whatsoever upon the accuracy measurement. This has the advantage that in making up a six wire cable to join circuits 20 and 21, I can use very fine size wire for paths 28, 29, 40 and 41 and relatively fine size wire for paths 30, 31. I find in actual practice I can make up a six wire cable of the same outside diameter as the conventionally used four wire cable and, with the circuit shown in Fig. 3, I can realize an improvement of as much as 50 to 1 as far as effects of cable resistance upon the measuring accuracy is concerned. Thus it will be seen that I have provided in the present invention a great improvement over prior art.

Still referring to Fig. 3, I provide overall span adjustments in the form of rheostats 42, 43 which are preferably, but not necessarily, in the form of a ganged pair to preserve circuit symmetry. It is to be noted that with this symmetrical arrangement I can adjust the overall span of the measuring system without affecting the zero adjustment. Therefore, in adjusting the calibration of a crane scale in the field, the operator merely sets the add steps and interpolating scale to zero, then brings indicator 34 to zero by adjusting the zero set. A known weight is then suspended from the crane scale and span adjustments 42, 43 are moved if necessary until the weight reading agrees precisely with the known weight.

An interesting and valuable variation of the measuring circuit of Fig. 3 is shown in Fig. 4 in which the add steps and interpolating scale bridges of Fig. 3 are replaced by simple potentiometer arrangements. To preserve the symmetry, the trimming shunts $S_3$ and $S_4$ are connected as shown although they could so far as function is concerned be connected merely across the add step section and interpolating slide wire units. Analysis of the action of the measuring circuits of Figs. 3 and 4 will show that it is a matter of choice as to which circuit is preferable. The bridge circuits of Fig. 3 have the advantage that the arms 44, 45 may be used to provide other functions such as sub-divisional add steps, tare weight adjustment, and the like. It is thus evident that the bridge circuits for add steps and interpolating scale in Fig. 3 are actually double potentiometers and that there is no real difference in principle between the embodiments of Figs. 3 and 4. As previously stated, the fixed contact points of the measuring potentiometer networks of Figs. 3 and 4 can just as well be adjustable if such additional adjustments are necessary or desirable.

In explaining the principles of the present invention I have used the expression "electrical conducting paths" in the broad sense of the word, although for simplicity I have illustrated in Figs. 2–4 inclusive the electrically conducting paths as physically continuous paths capable of carrying direct current. For the sake of completeness, I show in Fig. 5 how I can just as well use electrically conducting paths which are not physically continuous when I employ an A. C. power source 60. Thus, I can carry the power through conducting paths including a transformer coupling 61 in order to energize the various circuits. Similarly, I can introduce a transformer coupling 62 in the electrically conducting path which supplies power to the bridge of the measuring circuit generally indicated as 63. By obvious extension of the idea, I can couple the outputs of bridges 63 and 64 through transformers 65 and 66, the secondaries of which are connected in series to act upon null-balancing indicator 67. Otherwise, this circuit is the same as that of Fig. 2 and no further explanation of its operation is required to make clear to anyone skilled in the art what I mean by "electrically conducting paths" in the broad sense.

In the above it is obvious that I can just as well also use capacity coupling to complete my electrically conducting paths, or any combination of transformer, capacity, or direct wire coupling within the scope of the present invention. It might be pointed out as a practical matter that the employment of transformer coupling 62 in Fig. 5 is definitely advantageous since it isolates bridge 63 from bridge 64 so far as the mutual shunting action as found in Fig. 2 is concerned. The outputs of bridges 63 and 64 can then be directly connected in series without involving any of the complications discussed in my copending application on parallel bridge circuit operation.

Specifically it is seen that under the broad principle laid out in column 7, lines 1 to 38, at least one of the electrically conducting paths includes in series connection a coupling which is electrically conductive to alternating current but substantially non-conducting to direct current, and that the single source of power includes an alternating current component. In the disclosure above I have stated that the single source of power can be A. C. or D. C. or a combination thereof. By making use of a coupling which is substantially non-conductive to D. C. it may be seen that I can supply a combination of A. C. and D. C. voltage to the system and I can then use it to make two different measurements, one based on the A. C. component and the other on the D. C. component of the power source.

For example, I could in Fig. 5 use the A. C. arrangement shown to measure the load with indicator 67, while by superimposing a D. C. current in series with the secondary of transformer 61, I could simultaneously take the D. C. output of bridge 64 and use it for some other purpose such as an overload control on the crane. This could be done by connecting a sensitive D. C. relay across the output terminals of bridge 64.

It will, of course, be understood that various changes in details of construction and arrangement of parts may be made by those skilled in the art without departing from the spirit of the invention as set forth in the appended claims.

I claim:

1. A measuring circuit comprising at least one first potentiometer network and at least one second potentiometer network, each of said networks having two input and two output terminals, a single source of power for energizing both of said networks, means including a continuous electrical conductor for energizing said first potentiometer network through its input terminals from said sources of power, means including a continuous electrical conductor for energizing said second potentiometer network through its input terminals from said source of power, said last named conductor including in series at least a part of the first named conductor, said second potentiometer network having an electrical impedance which is large relative to the electrical impedance of the path connecting it to the said single source of power exclusive of said part of the first named conductor, whereby the relative magnitudes of the voltages applied across the input terminals of said first and second networks are substantially independent of the electrical impedance of said power conductor means, means for connecting the output terminals of said first potentiometer network and said second potentiometer network thereby to provide a single combined output which is proportional to the algebraic sum of the open circuit outputs of said first and second potentiometer networks, and means responsive to said single combined output, the relative contributions of said first and second potentiometer networks to the single combined output thereby being made substantially independent of the electrical impedances of both of said means for connecting them to said single source of power, said second potentiometer network including a potentiometer having two potentiometer contacts independent of each other and at least one of which is adjustable, said two contacts being connected in series with the output terminals of said second potentiometer network, said potentiometer being interposed between two isolating resistors which together exceed in electrical resistance the resistance of said potentiometer, and said potentiometer and isolating resistors being connected in series with the input terminals of said second potentiometer network.

2. A measuring circuit comprising at least one first potentiometer network and at least one second potentiometer network, each of said networks having two input and two output terminals, a single source of power for energizing both of said networks, means including a continuous electrical conductor for energizing said first potentiometer network through its input terminals from said source of power, means including a continuous electrical conductor for energizing said second potentiometer network through its input terminals from said source of power, said last named conductor including in series at least a part of the first named conductor, said second potentiometer network having an electrical impedance which is large relative to the electrical impedance of the path connecting it to the said single source of power exclusive of said part of said first named conductor, whereby the relative magnitudes of the voltages applied across the input terminals of said first and second networks are substantially independent of the electrical impedance of said power conductor means, means for connecting the output terminals of said first potentiometer network and said second potentiometer network thereby to provide a single combined output which is proportional to the algebraic sum of the open circuit outputs of said first and second potentiometer networks, and means responsive to said single combined output, the relative contributions of said first and second potentiometer networks to the single combined output thereby being made substantially independent of the electrical impedance of both of said means for connecting them to said single source of power, said means responsive to said single combined output having a high electrical input impedance, thereby to make its response substantially independent of the electrical impedance of said output terminal connecting means.

3. A measuring circuit comprising a plurality of potentiometer networks each having two input and two output terminals, all of said plurality of networks being adapted to be energized in parallel through their input terminals from a single source of power, at least one additional potentiometer network having two input and two output terminals, a single source of power for energizing all of said networks, means including a continuous electrical conductor for energizing said plurality of networks through said parallel arrangement from said source of power, means including a continuous electrical conductor for energizing said additional network through its input terminals from said source of power, said last named conductor including in series at least a part of the first named conductor, said additional potentiometer network having an electrical impedance which is large relative to the electrical impedance of the path connecting it to the said single source of power exclusive of said part of the first named conductor, means for connecting the output terminals of all of said plurality of networks thereby to provide a single output which is proportional to the algebraic sum of the open circuit outputs of the networks comprising the plurality, means for connecting said single output to the output of said additional potentiometer network thereby to provide a single combined output which is proportional to the algebraic sum of said single output and the output of said additional network, the relative contributions of said single output and the output of said additional network thereby being made substantially independent of the electrical impedances of both of said means for connecting said power source to said plurality of networks and to said additional network, said additional potentiometer network including a potentiometer having two potentiometer contacts independent of each other and at least one of which is adjustable, said two contacts being connected in series with the output terminals of said additional potentiometer network, said potentiometer being interposed between two isolating resistors which together exceed in electrical resistance the resistance of said potentiometer, and said potentiometer and isolating resistors being connected in series with the input terminals of said additional potentiometer network.

4. The combination set forth in claim 3 further characterized in that at least one of said plurality of networks includes a closed bridge circuit whose power input terminals are connected in series with the input terminals of said one network and whose output terminals are connected in series with the output terminals of said one network.

5. The combination set forth in claim 3 further characterized in that there is a plurality of said additional potentiometer networks, and means for including the outputs of all of said plurality of addtional potentiometer networks in said single combined output whereby said single combined output is proportional to the algebraic sum of said single output of the outputs of said plurality of additional potentiometers.

6. The combination set forth in claim 3 further characterized in that there is a plurality of said additional potentiometer networks at least one of which includes a closed bridge circuit whose input terminals are connected in series with the input terminals of said one additional network and whose output terminals are connected in series with the output terminals of said one additional network, and means for including the outputs of all of said plurality of additional potentiometer networks in said single combined output, whereby said single combined output is proportional to the algebraic sum of said single output and the outputs of said plurality of additional potentiometers.

7. The combination set forth in claim 1 further characterized in that said first potentiometer network includes a closed bridge circuit having its power input terminals connected in series with the input terminals of said first network and having its output terminals connected in series with the output terminals of said first network.

8. The combination set forth in claim 1 further characterized in that said second potentiometer network includes a closed bridge circuit having its power input terminals connected in series with the input terminals of said second potentiometer network and having its output terminals connected in series with the output terminals of said second network.

9. The combination set forth in claim 1 further characterized by the provision of a plurality of second potentiometer networks, and means for including the outputs of all of said plurality of second potentiometer networks in said single combined output.

10. The combination set forth in claim 1 further characterized in that both of said means including a continuous electrical conductor are adapted to transmit both alternating and direct current power.

11. The combination set forth in claim 1 further characterized in that at least one of said means including a continuous electrical conductor is adapted to transmit alternating current power while being substantially nonconductive to direct current power.

12. The combination set forth in claim 1 further characterized in that the output of said second potentiometer network is adapted to adjustably oppose the output of said first potentiometer network and in that said means responsive to said single combined output is a null balance sensing means, whereby the output of said first network can be measured by adjustment of the output of said second network substantially independently of the electrical impedance of said output connecting means as well as substantially independent of said means for connecting said networks to said source of power.

13. The combination set forth in claim 1 further characterized by the provision of a plurality of second potentiometer networks at least one of which has two potentiometer contacts independent of each other and at least one of said contacts being adjustable, said two contacts being connected in series with the output terminals of the corresponding potentiometer network, and means for including the outputs of all of said plurality of second potentiometer networks in said single combined output.

References Cited in the file of this patent

UNITED STATES PATENTS

| | | |
|---|---|---|
| 2,246,575 | Coleman | June 24, 1941 |
| 2,423,620 | Ruge | July 8, 1947 |

FOREIGN PATENTS

| | | |
|---|---|---|
| 160,253 | Germany | Mar. 25, 1941 |
| 717,546 | Germany | Feb. 17, 1942 |